United States Patent [19]

Timoney et al.

[11] Patent Number: 4,848,789
[45] Date of Patent: Jul. 18, 1989

[54] VEHICLE CHASSIS TRANVERSE STRUCTURAL MEMBER

[75] Inventors: Seamus G. Timoney, Dublin; Eanna P. Timoney, Meath, both of Ireland

[73] Assignee: Technology Investments Limited, Trim, Ireland

[21] Appl. No.: 178,939

[22] Filed: Apr. 7, 1988

[30] Foreign Application Priority Data

Apr. 7, 1987 [IE] Ireland .................................. 892/87
Nov. 30, 1987 [IE] Ireland .................................. 3241/87

[51] Int. Cl.$^4$ ............................................... B60G 3/00
[52] U.S. Cl. .................................... 280/701; 280/724
[58] Field of Search ............... 280/685, 701, 696, 722, 280/724

[56] References Cited

U.S. PATENT DOCUMENTS

| | | | |
|---|---|---|---|
| 2,075,585 | 3/1937 | Martin | 280/701 |
| 2,278,303 | 3/1942 | Blaser | 280/701 |
| 4,613,009 | 9/1986 | Nakamura et al. | 180/253 |

FOREIGN PATENT DOCUMENTS

| | | |
|---|---|---|
| 557333 | 5/1957 | Belgium ............................ 280/701 |
| 1045253 | 11/1958 | Fed. Rep. of Germany . |
| 3136305 | 3/1983 | Fed. Rep. of Germany . |
| 2221294 | 10/1974 | France . |
| 2571313 | 4/1986 | France . |
| 1222850 | 2/1971 | United Kingdom . |

Primary Examiner—Kenneth R. Rice
Attorney, Agent, or Firm—Sughrue, Mion, Zinn, Macpeak and Seas

[57] ABSTRACT

A vehicle transverse structural member (1), particularly for heavy vehicles, incorporates an axle and wheel assembly having independently sprung hub units (4). The structural member 1 provides both extra strength and stiffness for a chassis in addition to providing for improved wheel control.

6 Claims, 4 Drawing Sheets

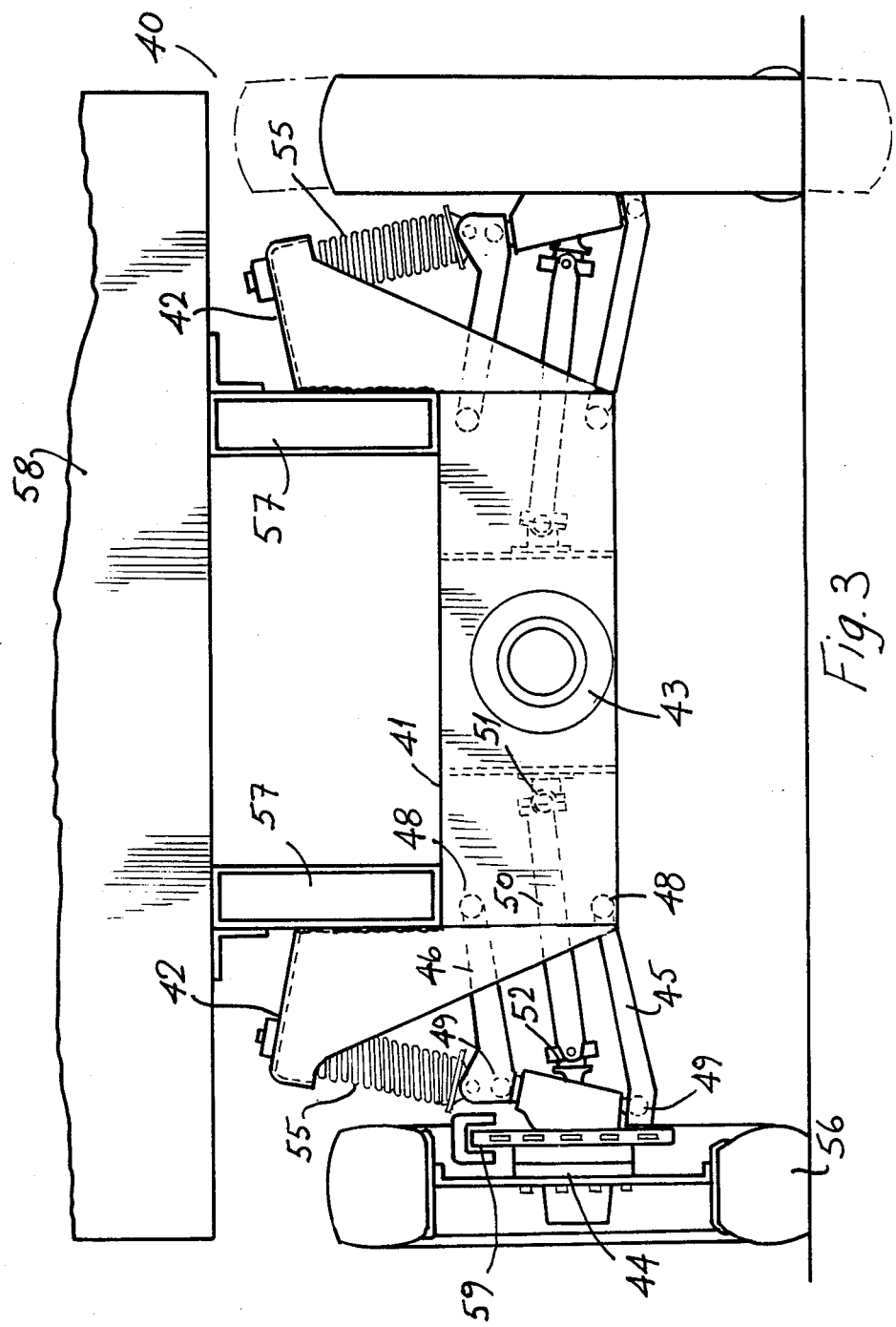

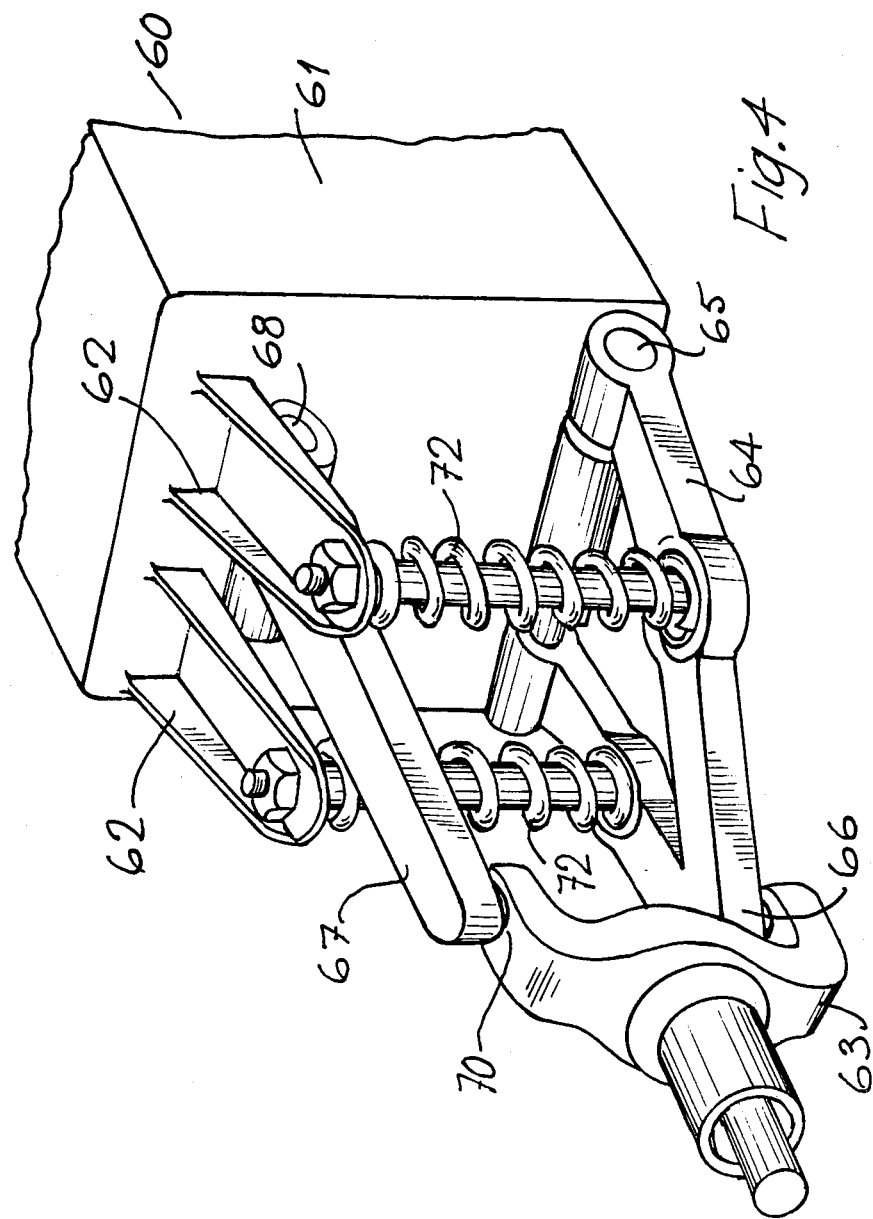

VEHICLE CHASSIS TRANVERSE STRUCTURAL MEMBER

BACKGROUND OF THE INVENTION

Introduction

The invention relates to vehicle chassis' and in particular to those for heavy vehicles.

FIELD OF THE INVENTION

At present most axle housings for driven wheels are resiliently mounted on a vehicle chassis. This arrangement unfortunately results in the chassis providing extensive twisting movement in response to force input at the wheels. In this way, the chassis generally supplements vertical wheel movement allowed by shock absorbers. Such chassis movement is, however, unpredictable and results in a partially uncontrolled movement of the wheels. This is especially true at high vehicle speeds. Further, the large unsprung weight and the rigid coupling between wheels on opposite sides of the vehicle inherent in this arrangement adversely affect vehicle performance and contribute to road damage. Additionally, as a result of the extensive twisting of the chassis, special mounting arrangements for the vehicle payload, engine and cab are required. It is known to provide axle and wheel assemblies in which the axle housing is secured to a vehicle chassis and the wheels are independently sprung. Such axle and wheel assemblies, however do not significantly contribute to chassis stiffness and are quite complex and therefore they are difficult to manufacture and to connect to a vehicle, especially if it is desired to connect them at different longitudinal positions on a vehicle. For example United Kingdom, patent specification Nos. 1,128,251 and 1,028,316 describe suspension arrangements in which the axle housing is secured to a vehicle frame. Resilient bushings, however, are used for some of the connections and, further, the wheel hub is also directly connected to the vehicle frame. These suspension arrangements do not prevent chassis twist or significantly improve wheel stability as the suspension arrangement does not contribute to chassis stiffness and the wheel hubs are directly connected to the vehicle frame. A further problem with these suspension arrangements is that they are relatively complex due to the number of connections to a vehicle chassis resulting in difficulties in manufacture and installation. For example, it would be extremely difficult to connect the suspension arrangements of these inventions at various longitudinal positions on a heavy vehicle.

OBJECT OF THE INVENTION

The present invention is directed towards providing a vehicle chassis transverse structural member to solve these problems.

SUMMARY OF THE INVENTION

According to the invention, there is provided a vehicle chassis transverse structural member incorporating a drive axle and wheel assembly, the assembly comprising:
an axle housing having a differential gear assembly;
at least one pair of independently sprung hub units, each hub unit having an associated transverse hub drive shaft, a support member, and a spring unit.

ADVANTAGES OF THE INVENTION

By incorporating a drive axle and wheel assembly in a transverse structural member, manufacture and installation of such an assembly is relatively simple and inexpensive. A further advantage of the invention is that chassis weight for vehicles, and especially heavy vehicles is substantially reduced as there is no need for separate transverse structural members in addition to those of the invention.

As the hub units are independently sprung and there is no movement of the axle housing relative to the vehicle body, an extremely steady foundation for active control of wheel movement is provided. This overcomes the problem of force input at wheels providing extensive twisting movement of a conventional chassis.

The invention will be more clearly understood from the following description of some preferred embodiments thereof, given by way of example only with reference to the accompanying drawings in which:

BRIEF DESCRIPTION OF THE DRAWINGS

FIG. 3 is a part cross sectional diagrammatic end view of an alternative construction of transverse structural member, in use;

FIG. 4 is a diagrammatic perspective view of portion of a further alternative construction of transverse structural member according to the invention.

DETAILED DESCRIPTION OF THE INVENTION

Figure 1:
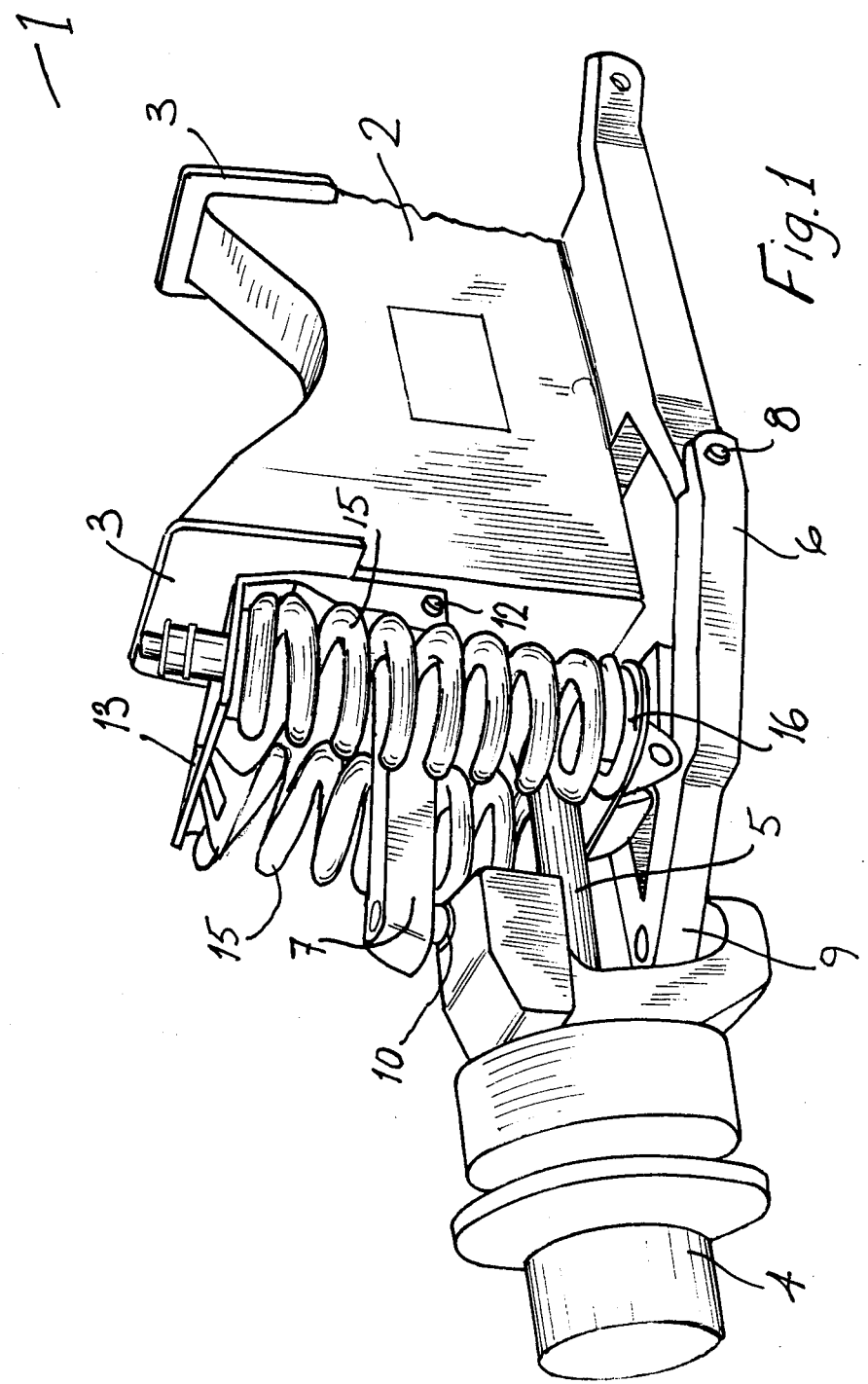
FIG. 1 is a perspective view from above of one side of a vehicle chassis transverse structural member according to the invention.

Referring to the drawings, and initially to FIG. 1 there is illustrated a vehicle chassis transverse structural member indicated generally by the reference numeral 1. The structural member 1 comprises an axle housing of a differential gear assembly (not shown) formed by a support casting 2 of cast-iron construction, having a pair of transverse struts 3 for rigid connection with a vehicle. The structural member 1 further comprises a pair of independently sprung hub units 4, each driven by a transverse hub drive shaft 5 pivotally connected at its inner and outer ends by universal joints (not shown) to the support casting 2 and the associated hub unit 4, respectively. The structural member 1 further incorporates two support members for each hub unit 4, namely, a lower support member 6 and an upper support member 7. In this case, the lower support member 6 is in the form of a wishbone member pivotally connected at pins 8 to the support casting 2 and to a stub axle 14 of the hub unit 4 at a spherical ball joint 9. The hub unit upper support member 7 is in the form of an arm connected to the stub axle 14 at a spherical ball joint 10 at its outer end and at its inner end it is pivotly connected at pins 12 to a spring bracket 13. Each hub unit 4 has two associated spring units, in this case springs 15. Each spring 15 is connected to a lower spring bracket 16 which is pivotly connected to the hub unit lower support member 6. At their upper ends, the springs 15 are connected to the spring bracket 13.

In this case, the upper and lower hub unit support members 7 and 6 and the stub axle 14 are of high strength cast iron construction.

Figure 2:
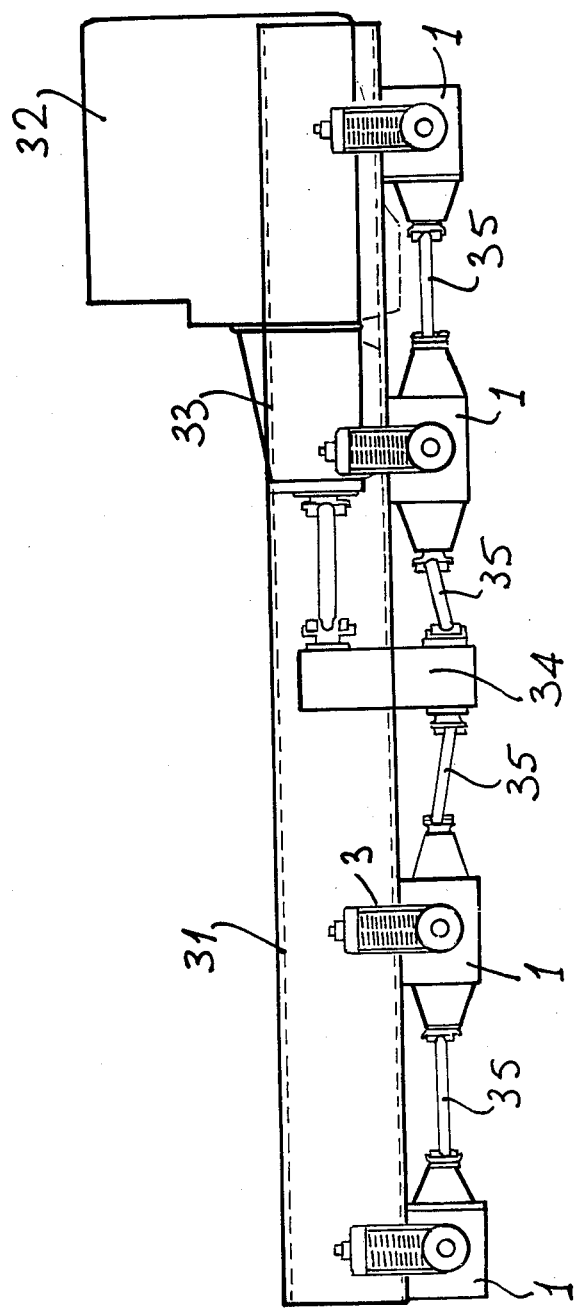
FIG. 2 is a diagrammatic cross-sectional side view of four of the structural members mounted on a heavy vehicle.

Referring now to FIG. 2, four of the structural members 1 are illustrated in use. Parts similar to those described with reference to FIG. 1 are identified by the same reference numerals. In this embodiment, the structural members 1 form part of a chassis of a heavy vehicle and are bolted between two longitudinal box sections 31. Mounted between the longitudinal box sections 31 there is an engine 32 driving a gearbox 33, which in turn feeds a transverse drop box 34. Vehicle drive shafts 35 with universal joint connections transfer drive from the transfer drop box 34 to the differential gear assemblies of each of the structural members 1. The support casting 2 of each structural member 1 is bolted to the longitudinal box sections 31 at the struts 3 and the spring brackets 13 are also bolted to the longitudinal box sections 31.

It will be appreciated that the only connections required for the structural member 1 are bolt connections at the struts 3 and the spring brackets 13. The structural member 1 may, therefore, be easily mounted at any desired position on a vehicle, or indeed, a trailer. As the structural member 1 forms part of the chassis and the hub units are independently sprung, an extremely steady foundation for active control of wheel movement is provided. This overcomes the problem of force input at wheels providing extensive twisting movement of a conventional chassis. A further advantage of the invention is that chassis weight for vehicles, and especially heavy vehicles is substantially reduced as there is no need for separate transverse structural members. Further, as there is no movement of the axle housing relative to the chassis and the vehicle body work connected to it, it is envisaged that the body work may be mounted low on the chassis and indeed it may be connected directly to the structural member 1.

As the hub units 4 are connected to the hub drive shafts 5 by universal joints and to the upper and lower support members 7 and 6 by spherical ball joints, they may be easily connected to a steering mechanism for steering. If it is not desired to use the wheels for steering, the hub units 4 may be relatively easily rigidly secured to the support casting 2 by tracking levers or other support members to prevent turning.

It will further be appreciated that as the structural member 1 may be relatively easily connected to other chassis members, installation time and costs are significantly reduced. Further, the invention allows drive to be relatively easily transferred to heavy trailers. Another advantage is that road damage is greatly reduced as wheels on opposite sides of the vehicle are each independently sprung.

It will also be appreciated that as the support casting, the brackets, the stub axles and the support members for the hub units are all of high strength cast iron construction, the structural member 1 is relatively cheap to manufacture, in addition to being extremely durable and suitable for use with heavy vehicles on unsuitable road conditions.

Referring now to FIG. 3 there is illustrated an alternative construction of structural member according to the invention indicated generally by the reference numeral 40. The structural number 40 incorporates an axle housing for a differential gear assembly 43 formed by a support casting 41 of rectangular box construction having two transverse reaction members 42 projecting upwardly and outwardly therefrom. The structural member 40 incorporates a pair of independently sprung hub units 44 supported by a lower wishbone member 45 and an upper wishbone member 46. Each of the wishbone members 45 and 46 is pivotally mounted on the support casting 41 at its inner end by pins 48 and is connected to the hub unit 44 by spherical ball joints 49. Each hub unit 44 also has a hub drive shaft 50 connected at its inner end to the differential gear assembly 43 by a universal joint 51 and at its other end to the hub unit 44 by a universal joint 52. I this case, each hub unit 44 has one associated spring unit, namely a spring and damper assembly 55 connected intermediate the upper wishbone member 46 and the associated transverse reaction member 42. Wheels 56 are mounted on each hub unit 44. The support casting 41 is illustrated in this case welded to longitudinal box sections 57 of a heavy vehicle 58. No other connections are required. The major difference between the structural members 1 and 40 of the invention are that in the latter the shock absorbers and the upper support members for the hub units are connected directly to the support casting of the structural member. A separate bracket is not provided in the latter case. The hub unit 44 includes outboard disc brakes 59.

Referring now to FIG. 4 there is illustrated one transverse side of an alternative construction of structural member, indicated generally by the reference numeral 60. Again, parts similar to those described with reference to the previous drawings are identified by the same reference numerals. The structural member 60 incorporates a support casting 61 having two integral transverse reaction members 62 at each side. An independently sprung hub unit 63 is also provided at each side. Each hub unit 63 has a lower wishbone support member 64 pivotally connected at its inner end to the support casting 61 at pins 65 and connected at its outer end to the hub unit 63 by a spherical ball joint 66. An upper support member for each hub unit 63 is provided in the form of an arm 67 pivotally connected at its inner end to the support casting 62 at pins 68 and at its outer end it is connected to the associated hub unit 63 by a spherical ball joint 70. In this case the ball of the spherical ball joint 70 is inserted in the upper support arm 67. The ball of the spherical ball joint 66 is inserted in the hub unit 63. In this case, there are two spring units associated with each hub unit 63, namely coil and damper assemblies 72. Each coil and damper assembly 72 is connected intermediate a lower wishbone support member 64 and a transverse reaction member 62. Each hub unit 63 has an associated hub drive shaft with universal joints at each end which, for clarity have not been illustrated in this embodiment.

It will be appreciated that this arrangement is extremely compact as the shock absorbers do not protrude above the level of the support casting 61. Again, many of the parts which, in use, will be stressed namely, the lower wishbone support member, the upper support arm, the stub axles of the hub units and the support casting 1 are of high strength cast construction. It will be appreciated that the axle and wheel assembly incorporated in the structural number 60 is extremely durable and reliable as vehicle load is transferred through the spring units 72, the lower wishbone support members 64 and thence through the hub unit 63. The upper support arm 67 is required to transmit horizontal components of impact loading and to restrain the hub unit.

Needless to say, the invention is not limited to the particular arrangements illustrated. For example, any type of spring unit may be used, for example, springs, or spring and damper assemblies. Hydro-pneumatic, pneumatic torsion bar or leaf configuration springs may be used. Further, the dampers will be direct acting strut, level, rotary or any other suitable configuration. It is also envisaged that the support members for the hub unit may be of any construction other than those illustrated. The hub unit of the invention may incorporate a speed reduction gear assembly. Although the structural member of the invention has been illustrated in one embodiment with outboard disc brakes, it is envisaged that inboard disc brakes may alternatively be used.

The invention is not limited to the embodiments hereinbefore described but may be varied in construction and detail.

We claim:

1. A chassis transverse structural member for heavy vehicles incorporating a drive axle and wheel assembly, the assembly comprising:
   an axle housing (2; 61) having a differential gear assembly, the axle housing being for rigid connection to a vehicle chassis to provide structural support;
   at least one pair of independently sprung hub units (4; 63), each hub unit having an associated transverse hub drive shaft (5);
   two separate support members for each hub unit, namely, an upper support member formed by an elongate arm (7; 67) connected to the respective hub unit by a spherical ball joint (10; 70) above a central axis thereof and a separate, lower support member in the form of a wishbone (6; 64) connected to the respective hub unit by a spherical ball joint (9; 66) below said central axis; and
   two spring units (15; 72) associated with each hub unit, said spring units being connected at their lower ends to the lower support member and arranged to be connected at their upper ends to a vehicle chassis or a member (13; 62) rigidly secured thereto.

2. A transverse structural member as recited in claim 1 in which at least one spring unit is a coil spring and damper assembly.

3. A transverse structural member as recited in claim 1 in which each hub unit incorporates a speed reduction gear assembly.

4. A transverse structural member as recited in claim 1 in which each hub unit support member is of high strength cast iron construction.

5. A transverse structural member as recited in claim 1 in which the axle housing is of high strength cast iron construction.

6. A transverse structural member as recited in claims 1, 4 or 5, in which the spherical ball joint between the lower support member and the hub unit has an upper portion formed by the lower support member and a lower portion formed by the hub unit, so that, in use, force input at the hub unit does not tend to disconnect the ball joint.

* * * * *